G. W. WILSON.
Car Coupling.
No. 57,807.
Patented Sept. 4, 1866.
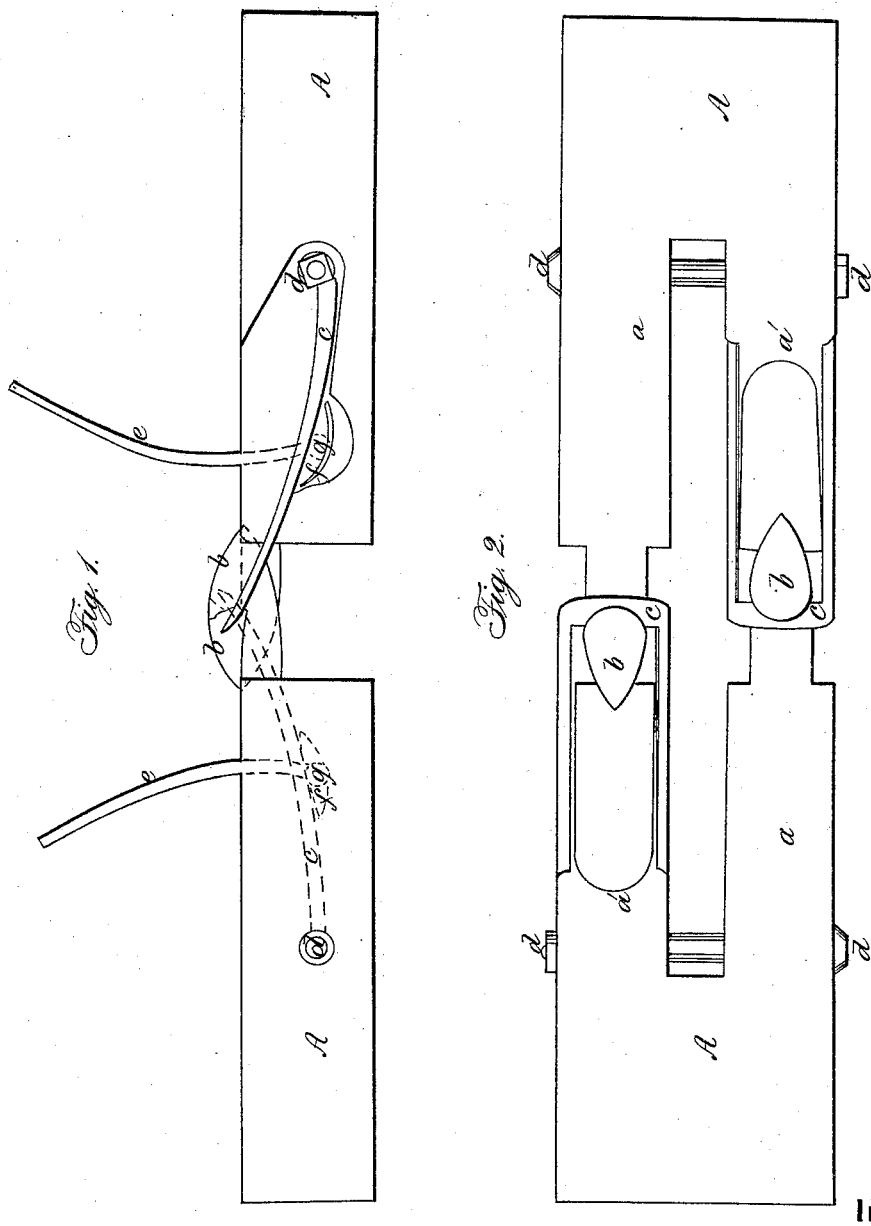

UNITED STATES PATENT OFFICE.

GEORGE W. WILSON, OF ABINGDON, ILLINOIS.

IMPROVED CAR-COUPLING.

Specification forming part of Letters Patent No. 57,807, dated September 4, 1866.

*To all whom it may concern:*

Be it known that I, GEORGE W. WILSON, of Abingdon, in the county of Knox and State of Illinois, have invented a new and useful Improvement in Car-Couplings; and I do hereby declare that the following is a full, clear, and exact description thereof, which will enable others skilled in the art to make and use the same, reference being had to the accompanying drawings, forming part of this specification, in which—

Figure 1 is a side view of the coupling connected. Fig. 2 is a plan of the coupling connected.

Similar letters of reference indicate like parts.

This invention consists in a simple device for coupling and uncoupling railroad-cars with dispatch, the coupling of double-slotted blocks and hooks being self-acting when the cars are brought together, and uncoupling by means of levers and cams, which are easily handled. The coupling also disengages itself when a car is thrown off the track, thus obviating much of the danger and injury arising from such accidents. It is very simple, strong, and reliable. It may be made of wrought or cast iron.

A A are rectangular iron blocks, to be affixed to the ends of the cars, as usual, in any suitable way, one on each end of the cars. They are cleft or slotted longitudinally in the middle, forming two prongs, $a$ $a'$. On the end of the prong $a$ is a stout hook, $b$, beveled and turned up at the end, and the prong $a'$ is grooved on the top, to correspond with and receive the hook $b$ of the opposite coupling-block when engaged, as shown in the drawings. On the grooved prong $a'$ is attached a bridle or shackle, $c$, to a pivot-bolt, $d$, which catches over the hook $b$ when the cars come together, rising on the bevel-point of the hook and falling behind it by its own weight.

The shackle $c$ is operated for uncoupling by a lever, $e$, with which is connected a segmental cam, $f$, on the side of the grooved prong $a'$, a pivot, $g$, passing from the lower end of the lever through the prong on which the cam $f$ is supported.

The coupling-blocks are made rights and lefts, so that when they engage the hook $b$ the prong $a$ on one side shall pass into the receiving-slot in the prong $a'$ on the other side, and the shackle $c$ on each prong $a'$ $a'$ shall slide over and catch on the hooks $b$ $b$ of both coupling-boxes at the same time, and thus effectually couple the cars by their own self-acting operation.

By raising or depressing the levers $e$ $e$ the cams $f$ $f$ on both coupling-blocks lift the shackles $c$ $c$ from the hooks $b$ $b$ and disengage them; or, if a car is thrown from the track, the hooks at once disengage themselves from the shackles and separate it from the cars with which it is coupled.

Having described the construction and operation of my invention, what I claim as new, and desire to secure by Letters Patent, is—

Constructing a car-coupling of two double-slotted blocks, A A, with hooks $b$ $b$ on one of the prongs $a$ $a$ of each block, fitting into corresponding grooves in the prongs $a'$ $a'$ of the other block, combined with the shackles $c$ $c$ and the cams $f$ $f$, constructed, arranged, and operated as and for the purposes herein described.

GEORGE W. WILSON.

Witnesses:
  E. P. JOHNSON,
  M. M. LUCY.